(12) United States Patent  
Levy et al.

(10) Patent No.: US 9,413,132 B2
(45) Date of Patent: Aug. 9, 2016

(54) OPTICAL POINTING SYSTEM

(71) Applicant: ISRAEL AEROSPACE INDUSTRIES LTD., Lod (IL)

(72) Inventors: Raphael Levy, Petah Tikva (IL); Michael Andorn, Holon (IL); Moshe Oron, Rehovot (IL); Guerman Pasmanik, Bat-Yam (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 14/436,283

(22) PCT Filed: Oct. 14, 2013

(86) PCT No.: PCT/IL2013/050827
§ 371 (c)(1),
(2) Date: Apr. 16, 2015

(87) PCT Pub. No.: WO2014/064679
PCT Pub. Date: May 1, 2014

(65) Prior Publication Data
US 2015/0303646 A1    Oct. 22, 2015

(30) Foreign Application Priority Data
Oct. 23, 2012    (IL) .......................................... 222621

(51) Int. Cl.
*H01S 3/10* (2006.01)
*G01S 17/66* (2006.01)
*H01S 3/30* (2006.01)

(52) U.S. Cl.
CPC ............. *H01S 3/10076* (2013.01); *G01S 17/66* (2013.01); *H01S 3/30* (2013.01)

(58) Field of Classification Search
CPC ........ H01S 3/10076; H01S 3/30; G01S 17/66
See application file for complete search history.

(56) References Cited

U.S. PATENT DOCUMENTS 4,005,935 A    2/1977  Wang
4,102,572 A    7/1978  O'Meara
(Continued)

FOREIGN PATENT DOCUMENTS

WO    96/30732 A1    10/1996

OTHER PUBLICATIONS

Khizhnyak et al. "Adaptive laser tracking using phase-conjugate coupled resonators", Lasers and Electro-optics (CLEO 2000), May 2000.*

(Continued)

*Primary Examiner* — Eric Bolda
(74) *Attorney, Agent, or Firm* — Oliff PLC

(57) ABSTRACT

A method for directing a laser pulsed beam towards a selected area/surface of an object, comprising transmitting from a laser assembly that includes an optical transmitter module a pulsed laser beam having a first pulse duration and illuminating therewith an area/surface of the object, thereby obtaining a reflected pulsed laser beam, the reflected pulsed laser beam including a leading portion reflected from a first reflecting area/surface of the object which is the area of the object that defines the shortest optical path between the optical transmitter module, the object and an optical receiver module; receiving, in a second laser assembly that includes the optical receiver module, the reflected pulsed laser beam and converting it into an amplified phase conjugated pulsed beam of a second pulse duration, and transmitting from the second laser assembly the amplified phase conjugated pulsed beam and illuminating therewith on selected area/surface of the object.

41 Claims, 6 Drawing Sheets

(56) References Cited

U.S. PATENT DOCUMENTS

| | | | |
|---|---|---|---|
| 4,231,534 | A | 11/1980 | Lintell et al. |
| 4,321,550 | A | 3/1982 | Evtuhov |
| 4,614,913 | A | 9/1986 | Honeycutt et al. |
| 4,664,518 | A | 5/1987 | Pfund |
| 4,837,769 | A | 6/1989 | Chandra et al. |
| 4,853,528 | A | 8/1989 | Byren et al. |
| 5,224,109 | A | 6/1993 | Krasutsky et al. |
| 5,273,236 | A | 12/1993 | Wootton et al. |
| 5,285,461 | A | 2/1994 | Krasutsky et al. |
| 5,351,250 | A | 9/1994 | Scott |
| 5,738,101 | A * | 4/1998 | Sappey ............... A61B 5/0059 356/450 |
| 6,115,123 | A * | 9/2000 | Stappaerts ............. G01S 7/486 250/201.9 |
| 6,961,171 | B2 | 11/2005 | Byren et al. |
| 8,217,375 | B2 | 7/2012 | Keegan et al. |
| 2002/0153497 | A1 | 10/2002 | Pepper et al. |
| 2010/0002743 | A1 | 1/2010 | Markov et al. |
| 2010/0128992 | A1 | 5/2010 | Duvent et al. |

OTHER PUBLICATIONS

Schäfer, Christian A. et al. "Tracking system by phase conjugation for laser energy transmission," In Lasers and Applications in Science and Engineering, International Society for Optics and Photonics, Proc. of SPIE, vol. 6454, pp. 64540A-64540A.

Frédéric Y. M. et al., "Study Of A Phase Conjugation Device For Pointing And Tracking Applications," La Recherche Aerospatiale (English Edition)(ISSN 0379-380X), No. 6, 1990, pp. 37-48. DRET-sponsored research, 6, 37-48.

Kawakami Kotomi et al., "Evaluation of tracking ability of a phase conjugate mirror using a CCD array and spatial light modulator for optical energy transmission," Applied Optics, vol. 51, No. 10, Apr. 1, 2012, pp. 1572-1580.

Havrilla David (of Trumpf, Inc.), "Laser-Based Manufacturing in the Automotive Industry," University of Virginia, Nov. 2010.

Tomov I.V. et al., "Phase conjugation and pulse compression of KrF-laser radiation by stimulated Raman scattering," Optics Letters, vol. 8, No. 1, Jan. 1983, pp. 9-11.

Kmetik Viliam, et al., "Very high energy SBS phase conjugation and pulse compression in fluorocarbon liquids," In Advanced High-Power Lasers and Applications, Proceedings of SPIE vol. 3889, 2000, pp. 818-826.

Markov Vladimir B., et al., "Adaptive Laser System for Active Remote Object Tracking," In Aerospace Conference Proceedings, IEEE, vol. 3, 2002, pp. 3-1445.

Markov V. et al., "System concept and some characteristics of the coupled-cavity laser system for active target tracking," International Symposium on Optical Science and Technology, International Society for Optics and Photonics, SPIE vol. 4825, 2002.

Ju You-Lun et al., "Laser Tracking and Pointing at a Target with Stimulated Brillouin Scattering" Chinese Physics Letters, Institute of Physics Publishing; Bristol, GB; vol. 22; No. 2, Feb. 1, 2005; pp. 346-348; XP020084907, ISSN: 0256-307X; DOI: 10.108810256-307X/22/2/022.

* cited by examiner

OPTICAL POINTING SYSTEM

FIELD OF THE INVENTION

This invention relates to the field of optical pointing systems towards objects.

BACKGROUND OF THE INVENTION

The need for laser pointing for various purposes has been encountered in many applications including e.g. the automotive industry.

Consider a production line of cars where it is desired to cut through the surface of the car at a given location within an area of interest. There is a need to aim on to the selected location cutting means such as a high power laser beam that impinges on the area of interest of the car. The use of remote laser pointing techniques for e.g. cutting, welding, scribing, photolithography, drilling or dimpling constitutes an advantage over known techniques. Obviously, remote laser pointing requires high accuracy to point to the designated area. There are known in the art techniques of remote laser cutting such as programmable focusing optics. Consider, for example, a car production line in which cars move from one station to the other until the manufacturing process is completed. Assume that during manufacture, there is a station where certain actions are applied to the car including remote drilling through a certain car part, say the roof, using a laser beam. A laser device that generates the laser beam should be a priori located at a given location and the laser beam should be pointed in a precise direction towards a point of interest on the car surface for drilling therethrough. The car, in turn, should be conveyed and precisely located at the specified station in a stationary state, such that the laser beam will achieve remote drilling through the car surface at exactly the desired location and only upon finalization of the drilling action may it move to the next station. Naturally, before moving to the next station, when the car is still in a stationary state, additional remote actions (such as drilling) are applied by directing the laser beam to the desired location. Another option is to move the laser together with the moving car, preserving their relative location.

References considered to be relevant as background to the presently disclosed subject matter are listed below. Acknowledgement of the references herein is not to be inferred as meaning that these are in any way relevant to the patentability of the presently disclosed subject matter.

The article by Schafer Christian A. et al., [Proceedings of the SPIE, Volume 6454, pp. 64540A (2007)], entitled *Tracking system by phase conjugation for laser energy transmission*, [Department of Computer & Systems Engineering, Kobe University, Japan] discloses a new concept for a retrodirective tracking system applicable for communication and power transmission. The power transmitter utilizes a beacon emitted from the receiver to obtain information about its direction by conjugating its phase inside a nonlinear medium. Power is therefore transmitted back to the receiver by the phase conjugated beam. The power can be amplified by an array of phase conjugators which provide a large aperture so that the intensity can be increased on the receiver's photovoltaic panels compared to a single element. A system design provides the basic understanding of this setup and basic experiments are conducted with two Co-doped $Sr_xBa_{1-x}Nb_2O_6$ (Co:SBN) crystals. There is occurrence of interference of two beams that are generated by four wave mixing from a divergent signal beam. In areas of constructive interference, a higher intensity than the single non-interfering beams provides, was observed.

The article by Khizhnyak, A. et al of MetroLaser, Irvine, Calif., entitled *Adaptive laser tracking using phase-conjugate coupled resonators*, was presented at the Conference on Lasers and Electro-Optics, 2000. (CLEO 2000). The article discloses the experimental realization of a coupled laser system that employs a phase conjugate mirror (PCM) and is capable of adaptively tracking a moving output coupler. A number of approaches have been suggested in order to develop a laser system that can lock-on and track a remote object. Active laser-based systems have an advantage over passive systems because they can establish communication channels, measure target velocity and spatial coordinates, and/or deliver high optical power levels. Active systems have been demonstrated in the laboratory using PCMs; however, they have generally been limited to locking on to static or very slow moving objects. For tracking remote, high velocity targets, several problems exist including: low returned power, high Doppler frequency shift, and large temporal delays. The article illustrates that laser resonators coupled with a PCM in a Michelson type arrangement can be used to overcome some of these limitations and track a remote moving object.

Frederic, Y. M. and Bodiansky, M. in *Study of a phase conjugation device for pointing and tracking applications* [La Recherche Aerospatiale (English Edition) (ISSN 0379-380X), no. 6, 1990, p. 37-48. DRET-sponsored research] discusses the complexity of conventional pointing and tracking systems, which seriously handicaps their performance when submicroradian accuracies are called for, as is typically the case in intersatellite communications. Phase conjugation, an application of nonlinear optics, could provide a solution to this problem. A simple theoretical model has been developed to predict the behavior and limitations of a phase conjugate mirror when tracking a moving target. This model has been verified by means of a self-focusing experimental arrangement using an argon laser and a photorefractive barium titanate crystal in a four-wave mixing configuration.

Kotomi Kawakami et al., in *Evaluation of tracking ability of a phase conjugate mirror using a CCD array and spatial light modulator for optical energy transmission* [Applied Optics, Vol. 51, Issue 10, pp. 1572-1580 (2012) http://dx.doi.org/10.1364/AO.51.001572] investigated the tracking ability of an optical phase conjugator using a commercial CCD array and a projector LCD panel. This system allows one to use two separate laser oscillators for capturing interference patterns and generating phase conjugate light. Since a long coherence length is not required for the latter part, amplification of the phase conjugate light can be easily attained by using a laser oscillator for high-power applications such as machining. The wavelengths of the two laser oscillators can be independently chosen. For experimental configuration an amplification factor of $7.8 \times 10^4$ is theoretically possible. Also, a formula for the maximum tracking range is derived. The proposed system is particularly suitable for power transmission by light.

U.S. Pat. No. 4,853,528 to Robert W. Byren, Hughes Aircraft Company, entitled A self-aligning phase conjugate laser discloses a method and apparatus for providing a laser beam that is automatically aligned with a substantially rigid, stabilized platform or frame that can be oriented over a wide angular range, such as by the gimbals of a laser pointing and tracking system. A single-transverse-mode master laser oscillator is mounted on the stabilized platform which is part of the inner gimbal, which can be rotated about an elevation axis, and a multipass laser amplifier with a phase conjugation mirror and an optional nonlinear frequency-conversion device are located off the inner gimbal. An outer gimbal or pedestal mount permits rotation about an azimuthal axis. The laser oscillator and laser amplifier are coupled by means of a beamsplitter and two reflecting elements. The laser media used for the oscillator and amplifier are either the same, or compatible media having the same wavelength. In an alternative embodiment the two reflecting elements are replaced by a flexible light waveguide such as a glass fiber. The phase conjugation mirror compensates the beam for the effects of optical aberrations caused by thermally induced changes in the amplifier medium and the nonlinear medium (if used) and also compensates the beam for angular tilt and jitter in the beam line of sight due to structural flexibility and motion of the stabilized platform. Four different embodiments are described in which the phase conjugation mirror is based on stimulated Brillouin scattering, degenerate four-wave mixing, three-wave mixing, and photon echo effects, respectively.

U.S. Pat. No. 4,231,534 to Robert J. Lintell et al [The United States of America as represented by the Secretary of the Air Force], entitled Active optical tracking system discloses an active optical tracking system for air-to-air type missiles of relatively small dimensions having a pulsed laser transmitter operating through a gimbaled mirror system and a reflection receiving system connected to the guidance and control unit of the missile to direct it to a target.

U.S. Pat. No. 5,224,109 to Krasutsky et al. entitled Laser radar transceiver, discloses a gimballed optical system within a seeker head, which includes a relatively low power laser coupled to a relatively higher power laser by way of a flexible fiber optic capable to reduce the mass that must be oscillated in a scan.

U.S. Pat. No. 4,614,913 to Honeycutt et al. entitled Inherently boresighted laser weapon alignment subsystem discloses a laser weapon which has no boresighting problems in that only one laser is said to perform all the functions of search, track, and negation. The laser weapon is made to operate in both a low power cw mode and a high energy pulsed mode about the boresight. This is accomplished by the application of a material which can be rapidly switched from a transmissive to a reflective state so as to be able to utilize the same laser for search, travel, and negation; thus eliminating the need for boresight and requiring only alignment.

U.S. Pat. No. 8,217,375 to Keegan et al. entitled Integrated pod optical bench design discloses an integrated gimbal and High-Powered Multiband Laser (HPMBL) for use in an infrared countermeasure apparatus in a pod mounted on an aircraft, the improvement comprising an optical bench that connects the optical path between side-by-side mounted gimbal and high power laser; and a kinematic mounting system that prevents optical bench bending.

U.S. Pat. No. 4,664,518 to Charles E. Pfund, entitled Secure communication system, discloses a secure communication system uses narrow beam laser transmissions between an orbiting satellite and another station which may be a submerged submarine. Position reporting by a laser transmission from the submarine to the satellite provides for tracking and data transmission between the stations. For strategic use tracking of the submarine for one way data transmission is achieved from a single laser transmission from the submarine while transporting mode operation is provided for a two-way transmission data link.

U.S. Pat. No. 5,351,250 to Andrew M. Scott entitled Optical beam steering device discloses an optical beam steering device which incorporates a laser, three Brillouin shifters, a four wave mixing cell and a low power beam steering device. The first shifter and the mixing cell contain $TiCl_4$, and the other shifters contain 20% $CCl_4$/80% $CS_2$. The first and third shifters frequency downshift the laser beam by $\delta\gamma_A$ and $\delta\gamma_B$ respectively. Light from the first shifter is amplified and provides a first pump beam input to the mixing cell. It then passes to the second shifter for frequency downshifting by $\delta\gamma_B$ and returns as a second cell pump beam. Light from the third shifter passes via the low power beam steering device to the cell as a weak input signal beam. The cell responds to the pump beams and signal beam by generating a high power beam which is a phase conjugate of the signal beam and retraces part of its steered path.

U.S. Pat. No. 6,961,171 to Robert W. Byren, entitled Phase conjugate relay mirror apparatus for high energy laser system and method discloses a system for directing electromagnetic energy. The inventive system includes a first subsystem mounted on a first platform for transmitting a beam of the electromagnetic energy through a medium and a second subsystem mounted on a second platform for redirecting the beam. The second platform is mobile relative to the first platform. The beam is a high-energy laser beam. The first subsystem includes a phase conjugate mirror in optical alignment with a laser amplifier. The first subsystem further includes a beam director in optical alignment with the amplifier and a platform track sensor coupled thereto. The second subsystem includes a co-aligned master oscillator, outcoupler, and target track sensor which are fixedly mounted to a stabilized platform, a beam director, and a platform track sensor. In the best mode, the stable platform is mounted for independent articulation relative to the beam director. A first alternative embodiment of the second subsystem includes first and second beam directors. The first beam director is adapted to receive the transmitted beam and the second beam director is adapted to redirect the received beam. In accordance with a second alternative embodiment, an optical fiber is provided for coupling the beam between the first platform and the second platform.

U.S. Pat. No. 5,285,461 to Nicholas J. Krasutsky, entitled Improved laser radar transceiver discloses a gimballed optical system within a seeker head which includes a relatively low power laser coupled to a relatively higher power laser by way of a flexible fiber optic capable to reduce the mass that must be oscillated in a scan.

U.S. Pat. No. 4,102,572 to Thomas O'Meara entitled Dual-wavelength coherent optical adaptive systems discloses a dual-wavelength coherent optical adaptive systems which comprise means for adaptively forming a first beam of a first wavelength, on a target and for deriving therefrom information defining characteristics of phase perturbations in the propagation path to the target; and means responsive to said information for compensating for propagation path distortions for a second beam of a second wavelength which is simultaneously transmitted along a substantially identical path to that of said first beam.

The presentation by David Havrilla of Trumpf, Inc., entitled "*Laser-Based Manufacturing in the Automotive Industry*", University of Virginia, November 2010, should also be considered as relevant prior art.

There is thus a need in the art for a new technique for pointing of a laser beam to a selected location of a surface/area of a moving object (say an area of interest in a car) e.g. for interacting (such as cutting or drilling) with the surface/area of the moving object.

SUMMARY OF THE INVENTION

In accordance with an aspect of the presently disclosed subject matter, there is provided a method for directing a laser pulsed beam towards a selected area/surface of an object, comprising:

(a) transmitting from a laser assembly that includes an optical transmitter module a pulsed laser beam having a first pulse duration and illuminating therewith an area/surface of the object, thereby obtaining a reflected pulsed laser beam; the reflected pulsed laser beam including a leading portion reflected from a first reflecting area/surface of the object which is the area of the object that defines the shortest optical path between the optical transmitter module, the object and an optical receiver module;

(b) receiving, in a second laser assembly that includes the optical receiver module, the reflected pulsed laser beam and converting it into an amplified phase conjugated pulsed beam of a second pulse duration;

(c) transmitting from the second laser assembly the amplified phase conjugated pulsed beam and illuminating therewith on selected area/surface of the object.

In accordance with an embodiment of the presently disclosed subject matter, there is further provided a method, wherein the selected area being the first reflecting area/surface of the object.

In accordance with an embodiment of the presently disclosed subject matter, there is yet further provided a method, further comprising angularly shifting the amplified phase conjugated pulsed beam by a given shift extent, and wherein the selected area being the first reflecting area/surface of the object shifted dependent upon the shift extent.

In accordance with an embodiment of the presently disclosed subject matter, there is yet further provided a method, wherein the first pulse duration falls in a nano-second range.

In accordance with an embodiment of the presently disclosed subject matter, there is yet further provided a method, wherein the second pulse duration falls in a pico-second range.

In accordance with an embodiment of the presently disclosed subject matter, there is yet further provided a method, further comprising transmitting by a preliminary laser assembly a preliminary pulsed laser beam having a preliminary pulse duration and illuminating therewith a sector that embraces an area of uncertainty where the object is possibly located to thereby obtain a pulsed laser beam reflected from the area/surface of the object;

receiving in the laser assembly the reflected pulsed laser beam and converting it into amplified phase conjugated pulsed beam to thereby generate the pulsed laser beam of the first pulse duration.

In accordance with an embodiment of the presently disclosed subject matter, there is yet further provided a method, wherein the laser assembly includes a laser transmitter for generating the pulsed laser beam.

In accordance with an embodiment of the presently disclosed subject matter, there is yet further provided a method, wherein the preliminary pulse duration falls in a nano-second range.

In accordance with an embodiment of the presently disclosed subject matter, there is yet further provided a method, further comprising, repeating above (a) to (c) to achieve interaction with the surface/area until a criterion is met.

In accordance with an embodiment of the presently disclosed subject matter, there is yet further provided a method, wherein the amplified phase conjugated pulsed beam having beam characteristics includes a beam intensity sufficient to give rise to the interaction.

In accordance with an embodiment of the presently disclosed subject matter, there is yet further provided a method, wherein the interaction includes cutting.

In accordance with an embodiment of the presently disclosed subject matter, there is yet further provided a method, wherein the interaction includes dimpling.

In accordance with an embodiment of the presently disclosed subject matter, there is yet further provided a method, wherein the interaction includes welding.

In accordance with an embodiment of the presently disclosed subject matter, there is yet further provided a method, wherein the interaction includes scribing.

In accordance with an embodiment of the presently disclosed subject matter, there is yet further provided a method, wherein the interaction includes photolithography.

In accordance with an embodiment of the presently disclosed subject matter, there is yet further provided a method, wherein the interaction includes drilling.

In accordance with an embodiment of the presently disclosed subject matter, there is yet further provided a method, wherein said optical amplifier is substantially depleted from preceding pumping after the amplified phase conjugated pulse beam that corresponds to the leading portion of the reflected pulse beam is generated.

In accordance with an embodiment of the presently disclosed subject matter, there is yet further provided a method wherein the object is moving.

In accordance with an embodiment of the presently disclosed subject matter, there is yet further provided a method, wherein the object substantially maintains spatial orientation while possibly being translated.

In accordance with an embodiment of the presently disclosed subject matter, there is yet further provided a method, wherein said moving object is rotating at a known rotation rate.

In accordance with an embodiment of the presently disclosed subject matter, there is yet further provided a method, wherein the object is stationary.

In accordance with an embodiment of the presently disclosed subject matter, there is yet further provided a method, further comprising applying frequency conversion.

In accordance with an aspect of the presently disclosed subject matter, there is yet further provided a method for directing a laser pulse beam towards a selected area/surface of a moving object, comprising extracting a leading portion of a pulsed laser beam reflected from at least part of the object that is illuminated by a pulsed laser beam having a first pulse duration; the extracting including applying selective phase conjugation and amplifying the leading portion of the received pulse beam, which portion is reflected from a first surface/area of the object which is the area of the object that defines the shortest optical path between the optical transmitter module, the object and the optical receiver module, thereby generating an amplified phase conjugated pulsed beam at a second pulse duration and redirecting it to the selected area or to an area shifted by a aerial shift extent relative to the selected area.

In accordance with an aspect of the presently disclosed subject matter, there is yet further provided a system for directing a laser pulsed beam towards a selected area/surface of an object, comprising a laser assembly that includes an optical transmitter module configured to transmit a pulsed laser beam having a first pulse duration and illuminating therewith an area/surface of the object, thereby obtaining a reflected pulsed laser beam; the reflected pulsed laser beam including a leading portion reflected from a first reflecting area/surface of the object which is the area of the object that defines the shortest optical path between the optical transmitter module, the object and an optical receiver module; a second laser assembly that includes a transmitter module, the optical receiver module, an optical amplifier associated with a phase conjugation mirror module configured to receive through the receiver module the reflected pulsed laser beam and converting it, utilizing at least the amplifier and phase conjugation modules, into an amplified phase conjugated pulsed beam of a second pulse duration; the second laser assembly is configured to transmit through the transmitter module the amplified phase conjugated pulsed beam and illuminating therewith on selected area/surface of the object.

In accordance with an embodiment of the presently disclosed subject matter, there is yet further provided a system, wherein the selected area being the first reflecting area/surface of the object.

In accordance with an embodiment of the presently disclosed subject matter, there is yet further provided a system, further comprising a shifter configured to angularly shift the amplified phase conjugated pulsed beam by a given shift extent, and wherein the selected area being the first reflecting area/surface of the object shifted dependent upon the shift extent.

In accordance with an embodiment of the presently disclosed subject matter, there is yet further provided a system, wherein the first pulse duration falls in a nano-second range.

In accordance with an embodiment of the presently disclosed subject matter, there is yet further provided a system, wherein the second pulse duration falls in a pico-second range.

In accordance with an embodiment of the presently disclosed subject matter, there is yet further provided a system, wherein the optical amplifier is substantially depleted from preceding pumping after the amplified phase conjugated pulse beam that corresponds to the leading portion of the reflected pulse beam is generated.

In accordance with an embodiment of the presently disclosed subject matter, there is yet further provided a system, further comprising a frequency converter for applying frequency conversion.

In accordance with an embodiment of the presently disclosed subject matter, there is yet further provided a system wherein the phase conjugation mirror module is selected from the group that includes Stimulated Brillouin Scattering (SBS) and Stimulated Raman Scattering (SRS).

In accordance with an embodiment of the presently disclosed subject matter, there is yet further provided a system further comprising a non-linear optical compressor for generating pulsed beam with different pulse duration than the pulse duration of the received pulsed beam.

In accordance with an embodiment of the presently disclosed subject matter, there is yet further provided a system, wherein the non-linear optical compressor is incorporated in the phase conjugation module.

In accordance with an embodiment of the presently disclosed subject matter, there is yet further provided a system, wherein an optical module that functions as both the transmitter optical module and the receiver optical module is common to the laser assembly and second laser assembly.

In accordance with an embodiment of the presently disclosed subject matter, there is yet further provided a system, wherein the dimension of the phase conjugation module along the pulsed beam propagation path complies with the pulse duration.

In accordance with an embodiment of the presently disclosed subject matter, there is yet further provided a system, wherein the dimension being in one or few millimeter range for pico-seconds pulse durations that falls in the range of 1 to 100 pico-seconds.

In accordance with an embodiment of the presently disclosed subject matter, there is yet further provided a system, wherein the lifespan of the phase conjugation module is selected in compliance with the pulse duration of the received pulse laser beam.

In accordance with an embodiment of the presently disclosed subject matter, there is yet further provided a system, wherein a pulse duration that falls in the range of 1 to 100 ps complies with short lived phase conjugation module.

In accordance with an embodiment of the presently disclosed subject matter, there is yet further provided a system, wherein a pulse duration that falls in the range of 1 to 100 ns complies with a long lived phase conjugation module.

In accordance with an embodiment of the presently disclosed subject matter, there is yet further provided a system, further comprising a preliminary laser assembly that includes an optical transmitter module configured to transmit a preliminary pulsed laser beam having a preliminary pulse duration and illuminating therewith a sector that embraces an area of uncertainty where the object is possibly located to thereby obtain a pulsed laser beam reflected from said area/surface of the object, the laser assembly includes an optical amplifier associated with phase conjugation mirror module and is configured to receive through the receiver module the reflected pulsed laser beam and converting it, utilizing at least the amplifier associated with phase conjugation mirror module, into amplified phase conjugated pulsed beam to thereby generate the pulsed laser beam of the first pulse duration.

In accordance with an embodiment of the presently disclosed subject matter, there is yet further provided a method, wherein the angular shifting of the amplified phase conjugated pulse beam is brought about by angularly shifting the reflected pulse beam.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
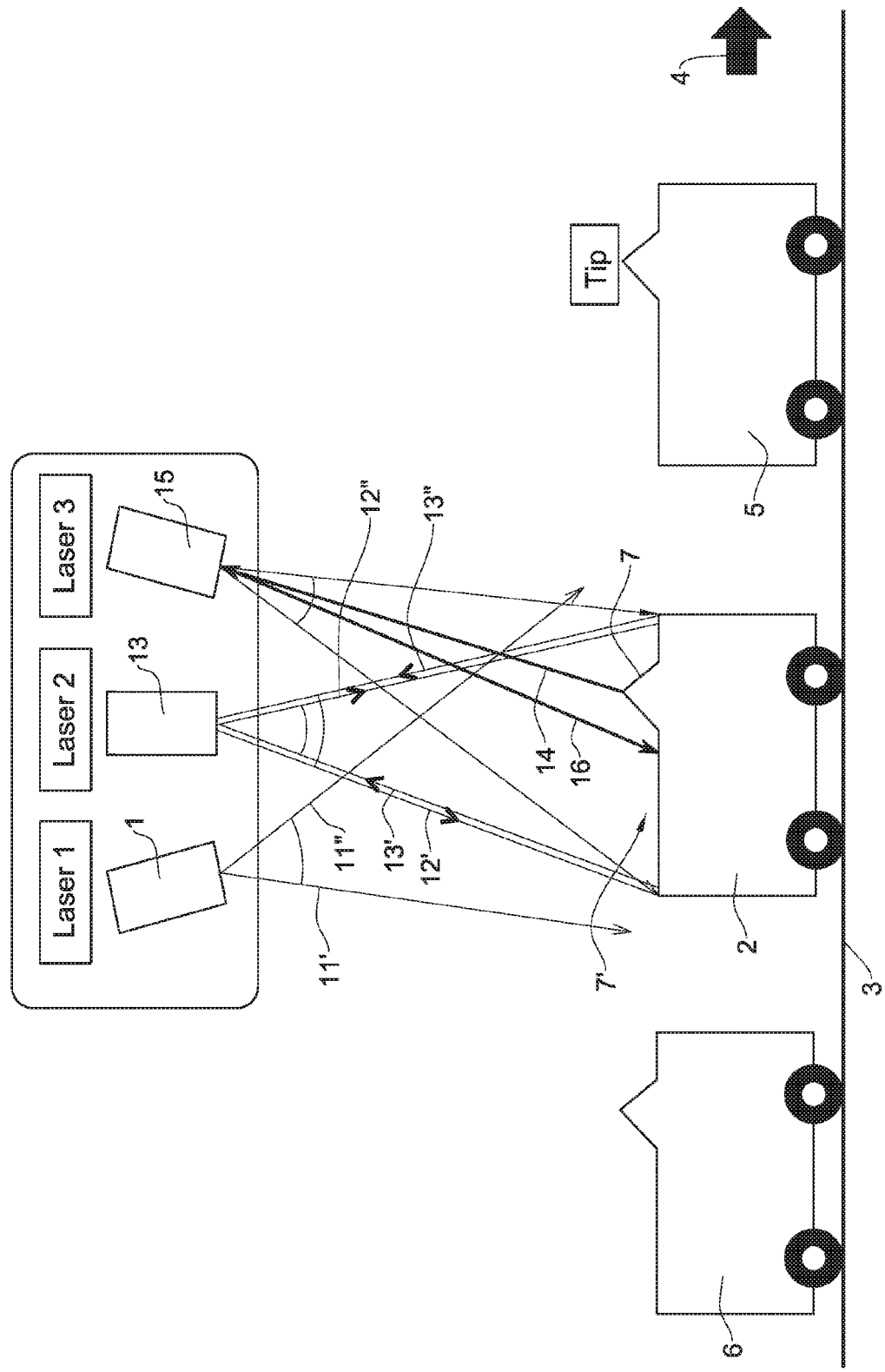
FIG. 1 is a schematic generalized illustration of an operational scenario, in accordance with certain embodiments of the invention.

In the drawings and descriptions set forth, identical reference numerals indicate those components that are common to different embodiments or configurations.

Attention is now drawn to FIG. 1 illustrating a system in accordance with certain embodiments of the invention. Thus, the system illuminates through a first laser assembly 1 a pulsed laser beam onto a moving object, by this example a car 2 (illustrated schematically) which moves along a production conveyer 3 (in direction 4). By way of example there is a need to interact with the surface of the car by cutting a cavity for accommodating a sunroof, using a remote laser beam. By this example, car 5 has already been processed, whereas car 6 is still to be processed. As will be explained in greater detail below, the system can point with desired accuracy, on a selected area of the surface/area of the moving object and interact (e.g. cut, drill etc.) therewith. As will be further explained below, the system is required to detect reflections from a first reflecting area/surface of the object which includes a reference tip (e.g. 7). Note that the reference tip that is associated with the object may be an integral part of the object, (as is the example of FIG. 1) or be temporarily attached. The invention is not bound by any specific constraints on the first reflecting area/surface of the object as long as (in accordance with certain embodiments) it is the area of the object that defines the shortest optical path between the optical transmitter module, the object and the optical receiver module, all as will be explained in greater detail below.

It should be noted for clarity that while generally an optical path is defined between points, in accordance with certain embodiments of the invention, the resolution of the PC is in the order of 1 pulse length, thus substantially all the points on the object area/surface that the optical path from the transmitter module to them and to the optical receiver module, is within the resolution of the PC round trip from the shortest (e.g. 0.015 cm for 1 ps), will comply with the "area of the object that defines the shortest optical path between the optical transmitter module, the object and the optical receiver module."

Whereas the example of FIG. 1 has exemplified cars (being a specific example of objects) which move along a manufacturing conveyer, those versed in the art will readily appreciate that the invention is not bound by this particular example of interacting with a surface/area of a moving object. Thus, in accordance with other embodiments, the interaction may be any action that can be achieved by means of a remote laser, including but not limited to cutting, welding, scribing, photolithography, drilling, dimpling etc. at a given location (e.g. drilling a hole at a designated location and diameter), cutting of a desired pattern, etc.). An object is obviously not bound by a car or car part. In accordance with yet certain other embodiments, the objects do not necessarily move along a known route, as long as it substantially maintains its orientation. Note that in accordance with certain embodiments the orientation is maintained even if the object is subjected to translation. Note that in accordance with certain embodiments, the moving object rotates (about at least one of pitch, roll or yaw axes) at a known rotation rate and the desired interaction with the object notwithstanding the object's rotation will be achieved utilizing e.g. a shifter module as discussed in detail below.

Note incidentally that in the specific embodiment of FIG. 1, the conveyer moves along a known path. In accordance with certain embodiments the object is stationary.

Obviously, the invention is not bound to be used in the automotive industry. Other variants are applicable, all as required and appropriate, depending upon the particular application.

Bearing this in mind and before moving on to further describe FIG. 1, attention is drawn also to FIGS. 2 and 3A-C showing a schematic generalized illustration of an operational scenario where a portion of the object is illustrated in larger scale, in accordance with certain embodiments of the invention.

Figure 2:
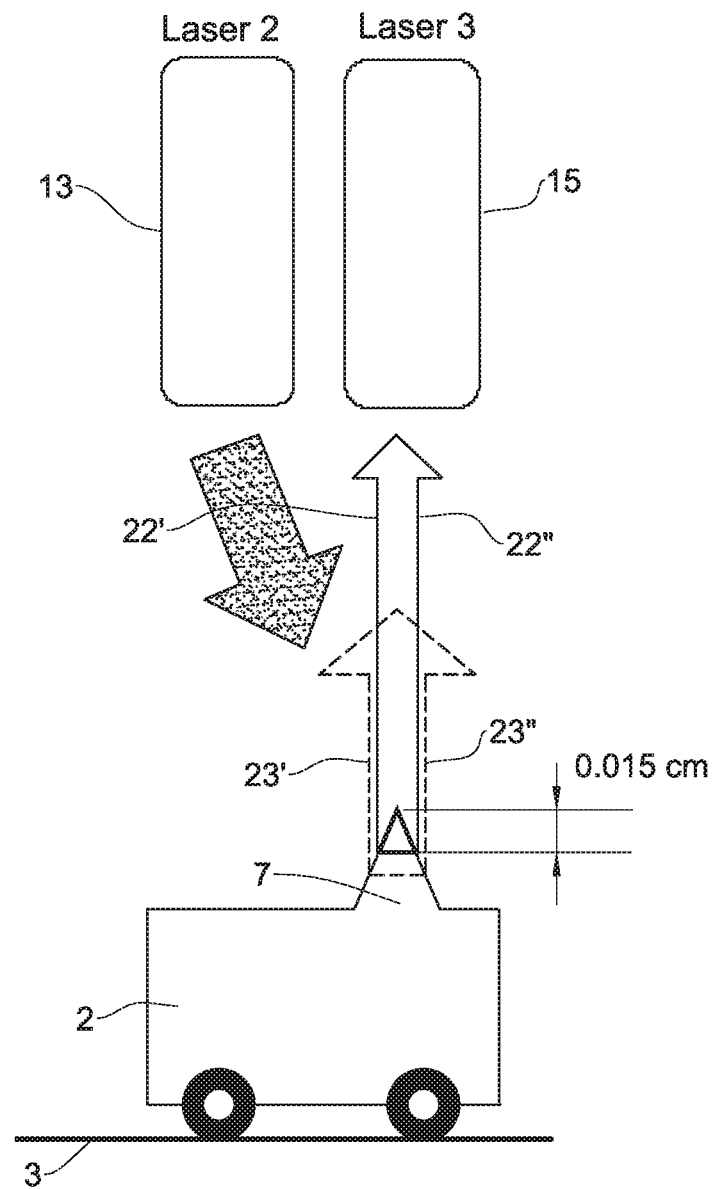
FIG. 2 is a schematic generalized illustration of an operational scenario where a portion of the object is illustrated in larger scale, in accordance with certain embodiments of the invention.

It should be noted that FIGS. 1 to 3 (and also FIGS. 4-6 described below) are of schematic nature and serve for clarity of explanation only and accordingly they are not an accurate representation, including non-accurate representation of scale proportions and of precise optical beam propagation paths. In accordance with certain embodiments, laser 1, 13, and 15 in FIG. 1 are located in close proximity relative to the distance to the object.

Thus, as shown in FIG. 3, laser assembly 1 includes a laser transmitter 31 that is coupled to optical module 32 and configured to illuminate a sector 11', 11" (see FIG. 1) that embraces an area of uncertainty where the object 2 is possibly located (by this particular example the whole object). By this example and as shown in FIG. 1, the sector 11', 11" indeed includes the object 2.

By this example, the laser assembly may have relatively large pulse duration say at the order of Nano-seconds (ns), e.g. 1 ns, giving rise to a beam resolution of 15 cm. The specified resolution will prescribe the size of the illuminating spot. By this particular example, since the resolution of 15 cm (34) exceeds the longitudinal dimension of the tip 7 then the first area from which the incident laser beam will be reflected (12' and 12") is in fact, the frontal surface 7' of the whole object including reference tip 7.

The invention is, of course, not bound by the specified numeric values and/or the tip/object geometry.

Figure 3C:
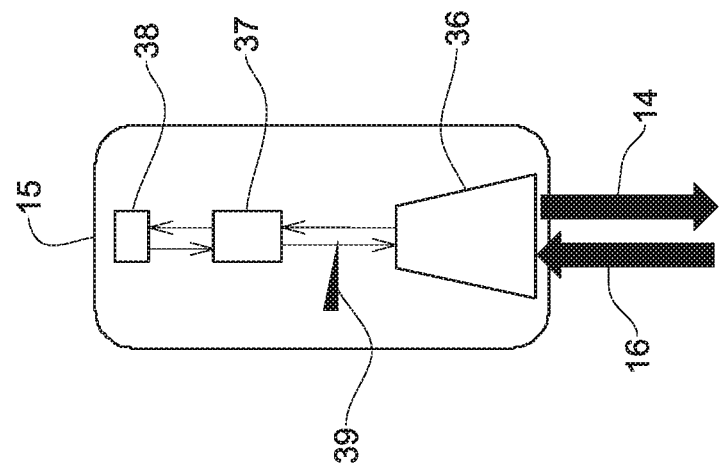
FIGS. 3A-C illustrate, each, a partial sequence of operations involving a distinct laser assembly in accordance with certain embodiments of the invention.
Figure 3B:
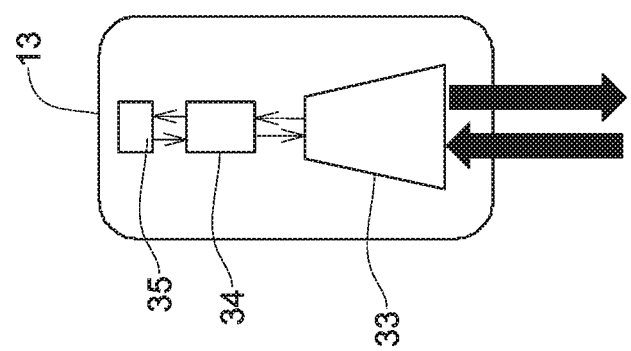
Figure 3A:
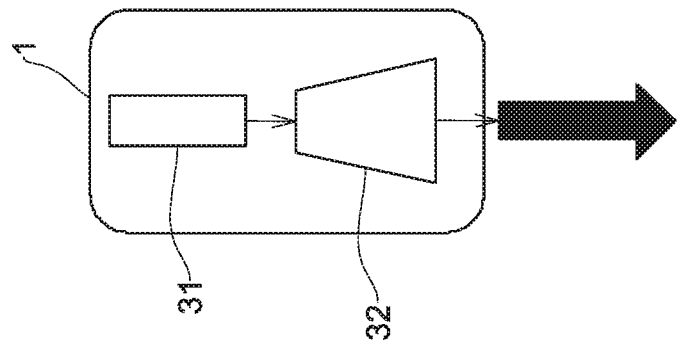

Consequently, a reflected pulsed laser beam is received from the object 2 by an optical module of the second laser assembly (33 and 13, respectively of FIG. 3B). Note that the optical module is illustrated in a schematic fashion only.

As also shown in FIG. 3B, the so received laser beam is fed by an optical amplifier 34 and phase conjugation mirror module 35 that forms part of laser assembly 13. As will be explained in greater detail below (with reference to FIGS. 4 and 5) the so received reflected pulsed laser beam is amplified (in optical amplifier 34), undergoes selective phase conjugation (in phase conjugation mirror module 35) and additional amplification (in optical amplifier 34), for generation of amplified phase conjugated pulse beam 13' and 13". The so generated pulse beam may have different characteristics e.g. a pulse duration that falls in the range of Pico-seconds (ps), e.g. 1 ps of significantly finer resolution of 0.015 cm. In order to "convert" the so received reflected beam in the ns range to a ps range, a known per se non-linear pulse compressor may be incorporated in the phase conjugator module or it may be used elsewhere in the laser assembly (not shown in the Figs.) The invention is of course not bound by any pulse duration or specific range(s). For more details of combining compression and phase conjugation, refer to, for instance, "Phase conjugation and pulse compression of KrF-laser radiation by stimulated Raman scattering", I. V. Tomov, R. Fedosejevs, D. C. D. McKen, C. Domier, and A. A. Offenberger: Optics Letters, Vol. 8, Issue 1, pp. 9-11 (1983); or, "Very high energy SBS phase conjugation and pulse compression in fluorocarbon liquids", Kmetik, Viliam; Yoshida, Hidetsugu; Fujita, Hisanori; Nakatsuka, Masahiro; Yamanaka, Tatsuhiko: Proc. SPIE Vol. 3889, p. 818-826, Advanced High-Power Lasers, Marek Osinski; Howard T. Powell; Koichi Toyoda; Eds.

As will be explained in greater detail below, due to the specific characteristics of the phase conjugator module and pre-preparing of the pump energy and pumped energy depletion of the optical amplifier, then only the leading portion of the phase conjugated beam will be amplified, whereas amplification of the trailing portion thereof will be substantially reduced. By one embodiment, the leading portion corresponds to a first reflecting area/surface of the object which is the area of the object that defines the shortest optical path between the optical transmitter module, the object and the optical receiver module, all as will be exemplified in greater detail below.

Moving on with FIG. 1, the laser assembly 13 will generate an amplified phase conjugated pulse beam 13' 13" that illuminates the specified first reflecting area/surface (and by this embodiment the front surface 7' of object 7). Note that this area/surface will be illuminated by virtue of the fact that the phase conjugated module has received a reflected beam (12' 12") from exactly this surface 7' and by virtue of its inherent characteristics of phase conjugation to cause the illuminated beam to impinge on the same surface which generated the reflection.

As will be further discussed below, the spatial resolution of the pulse of the phase conjugator that should be matched to the pulse duration of the illuminating beam. Phase conjugation and amplification of the returns from the entire target, or part thereof yields an illumination beam with a spatial resolution equivalent to the physical length of the laser pulse (e.g. 15 cm for a 10 nano-sec pulse).

Figure 6:
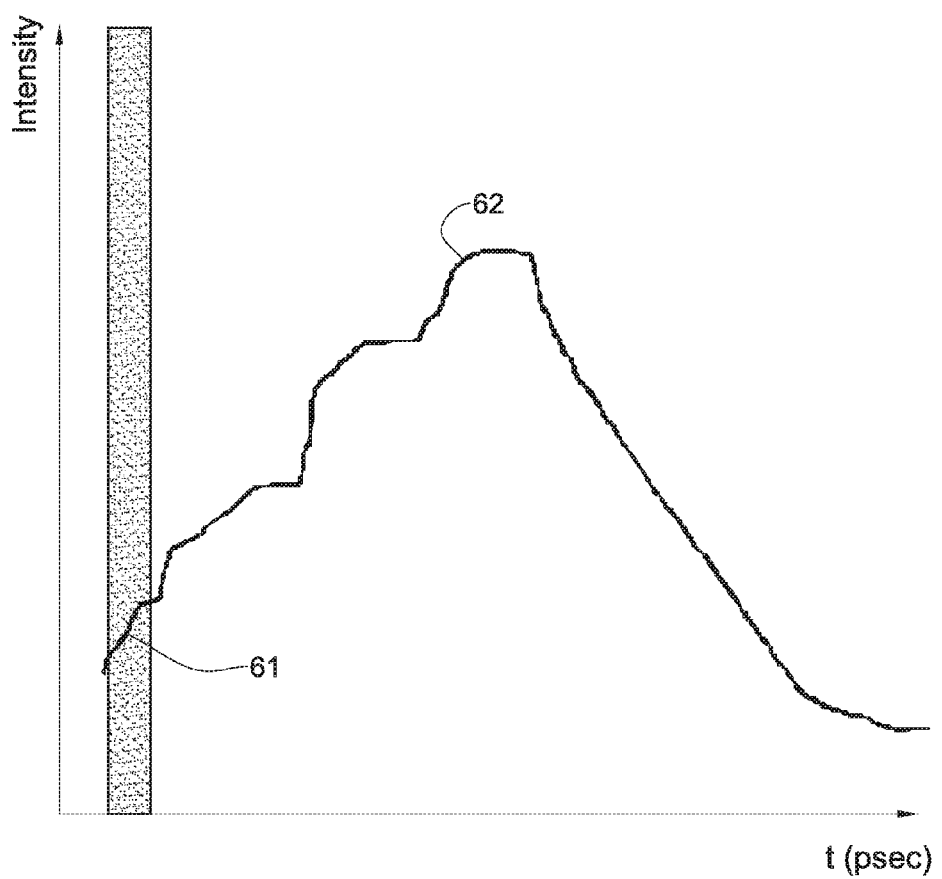
FIG. 6 is a graph representation of a reflected pulsed laser signal, in accordance with certain embodiments of the invention.

After having illuminated the specified area with pulsed beam 13', 13" having a pulse duration of say 1 ps, (with a resolution of say 0.015 cm) this will "prescribe" the first reflecting area/surface (see 21 of FIG. 2) of tip 7 (of object 2) from which the leading portion of the received beam (22', 22") will be returned (see also 61 of FIG. 6). This is also shown as the leading portion of the received beam 14 in FIG. 1.

Note that the trailing portion of the reflected beam will be reflected in response to subsequent incident of beam 13', 13" (see for instance the dashed line 23', 23" indicating on a reflected beam portion forming part of the trailing portion of the reflected pulse beam).

Note that the higher resolution of say a 1 ps pulse duration has dictated a shorter resolution (of the order of 0.015 cm) and therefore a smaller surface 22 (forming only part of tip 7) from which the leading edge 14 of the reflected beam will be returned (constituting a smaller spot) compared to the lower resolution of, say 1 ns which dictated a resolution (of the order of 15 cm) and therefore a larger surface (the entire frontal surface 7' of object 2) from which the leading edge 12', 12" of the reflected beam will be returned (constituting a large spot).

Note also that the first reflecting area/surface 21 of tip 7 from which the leading portion of the received beam (22', 22") will be the area of the object that defines the shortest optical path between the optical transmitter module, the object and the optical receiver module.

Bearing this in mind, and reverting now to FIGS. 1 and 3C, the so received laser beam 14 (by the optical module 36 of assembly 15) is fed by an optical amplifier 37 and phase conjugation mirror module 38 that forms part of laser assembly 15. The so received reflected pulsed laser beam is amplified (in optical amplifier 37), and undergoes selective phase conjugation (in phase conjugation mirror module 38) as well as additional amplification (in optical amplifier 37), for generation of amplified phase conjugated pulse beam 16. The so generated pulse beam may have different characteristics e.g. different pulse duration and to this end may utilize a non-linear optical compressor (as discussed above). Note that the pulse may possibly have other characteristics, such as beam intensity, wavelength etc.

In accordance with certain embodiments, by virtue of the inherent characteristics of the phase conjugation process, the so generated amplified phase conjugated beam 16 will illuminate the same specified first reflecting area/surface 21 from which the leading edge 14 (or 21' 22" in FIG. 2) was reflected.

It should be noted that in accordance with certain embodiments, the laser assembly (e.g. 15 of FIG. 3C) may further include a known per se angular beam shifter 39 (such as a shifter based on e.g. a non-reciprocal phase conjugation which introduces for instance a wedge into the optical return path). Such a shifter may be disposed e.g. between the amplifier 37 and the optical module 36 for shifting said amplified phase conjugated pulse by a given shift extent (or to other locations). When utilizing a shifter, the selected area is said reflected area on the surface of the object shifted by an aerial shift that is dependent upon said shift extent. This has been illustrated schematically in FIG. 1 by beam 16 that is shifted relative to beam 14.

Figure 4:
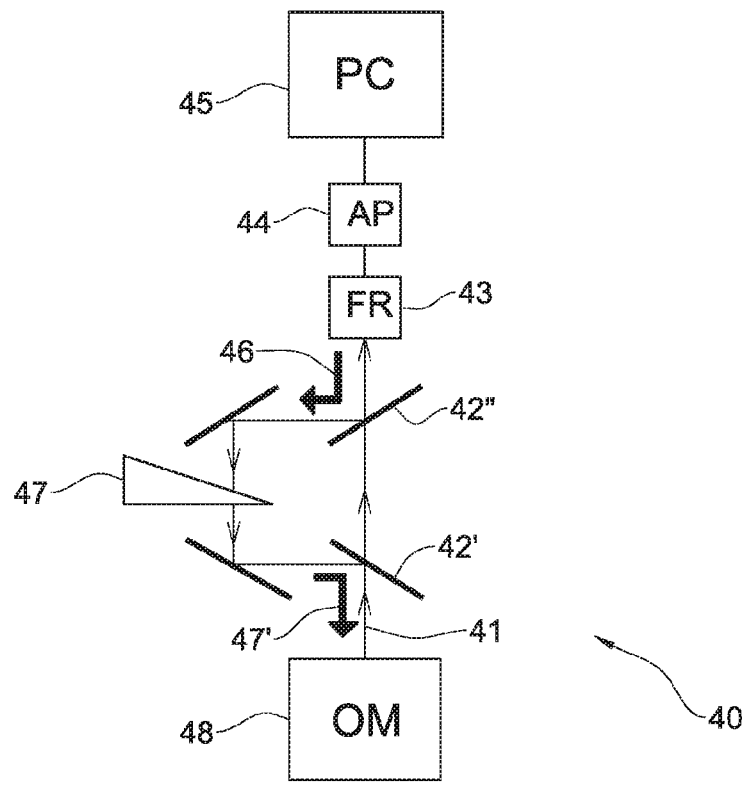
FIG. 4 illustrates schematically an angular shifter associated with a laser assembly in accordance with certain embodiments of the invention.

FIG. 4 illustrates schematically an angular shifter (see e.g. including 39 in FIG. C) associated with a laser assembly in accordance with certain embodiments of the invention. Thus, and as shown in FIG. 4, an angular polarized beam assembly 40 is utilized for achieving the specified shifter. Thus, the incoming reflected beam 41 (received through receiving optical module 48) is incident on, say, polarizing beam splitter (42' and 42") which allows, say, vertical polarization of the received beam to pass through and thereafter is subjected to a 45 degrees polarization rotation per pass (90 degrees in round trip) by e.g. a known per se Faraday Rotator (FR) 43 and therefrom to the amplifier and Phase Conjugator modules discussed herein (44 and 45). Then, the returning beam (after passing the FR module for the second time, achieving a cumulative 90 degrees polarization rotation, i.e. horizontal polarization) will be diverted by 42" to a different path 46. The latter beam passes through known per se angular shifter 47 for effecting a desired shift extent, re-diverted 47 through 42' towards the transmitter optical module 48 for illuminating the object with the desired shift extent. The invention is of course not bound by this particular example of implementing a shifter (e.g. not bound by the utilization of a beam splitter, Faraday Rotator etc.) and is likewise not bound by the location of the elements (e.g. not necessarily disposed between the optical module and the amplifier). By way of example a shifter may be disposed (in addition or instead of shifter 47) between 42' and 42" (not shown in FIG. 4). The invention is not bound by this example.

Bearing this in mind, the illuminating beam, e.g. 16 will interact with the surface of the object, e.g. ablating, cutting, drilling and/or welding. Note that the latter beam's characteristics may be the same or different from that of the second laser (e.g. different wavelength, pulse duration, intensity etc.) depending among others on the desired interaction with the surface (e.g. ablation). Note also that in certain embodiments, it may be desired to angularly shift the beam for achieving interaction with the surface/area of the object at different locations, all as explained in detail above.

Normally, in order to achieve a desired interaction, it may be required in accordance with certain embodiments to repeat focusing of the laser beam onto the same selected area/surface of the moving object, and provide holding of the laser beam on that area. To this end, the specified sequence of operations described with reference to laser assemblies 1, 13 and 15 may be applied repeatedly until a condition is met e.g. a certain criterion, such as elapsed time for achieving the specified interaction.

Note that the selected area for interacting with the surface is not necessarily fixed, namely the illuminated area may change in order to achieve e.g. cutting of a designated shape.

Note also that for achieving a cut, say through a process of ablation, the laser beam characteristics have a power density that exceeds a given threshold.

Figure 5:
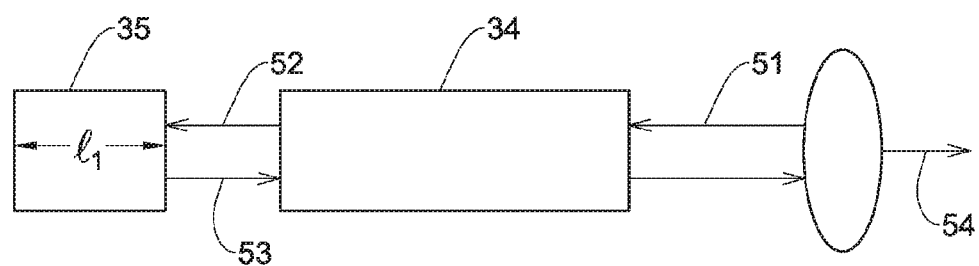
FIG. 5 illustrates schematically, a phase conjugator module and an optical amplifier module, in accordance with certain embodiments of the invention.

Having described various embodiments of a directing laser beam to a selected area/surface of an object, attention is drawn to FIG. 5 for a better understanding of the operation of selective phase conjugation and the optical amplifier.

Thus, and as may be recalled (with reference also to e.g. FIGS. 3B and 3C), the so received reflected pulsed laser beam (51 in FIG. 5, 14 in FIG. 1) is fed to an optical amplifier 34 and phase conjugation mirror module 35 that forms part of laser assembly 15. The so received reflected pulsed laser beam is amplified 52 (in optical amplifier 34), undergoes selective phase conjugation (in phase conjugation mirror module 35) and the resulting phase conjugated beam 53 undergoes additional amplification (in optical amplifier 34), for generation of an amplified phase conjugated pulse beam 54 (16 in FIG. 1). Note that the beams and the optical propagation paths are depicted in the various FIGS. in a schematic fashion only and not in accordance with precise optical rules of light beam propagation (which are generally known per se).

As will be explained in greater detail below, due to the specific characteristics of the phase conjugator module and pre-preparing of the pump energy and pumped energy depletion of the optical amplifier, then only the leading portion of the phase conjugated beam will be amplified, whereas the amplification of the trailing part thereof will be substantially reduced. By one embodiment the leading portion corresponds to a first reflecting area/surface of the object which is the area of the object that defines the shortest optical path between the optical transmitter module, the object and the optical receiver module.

Bearing this in mind, selective phase conjugation (utilizing optical amplifier 34 and phase conjugation module 35) is accomplished by a design that provides at least some of the following:

a. Illumination of the object by a laser pulse (e.g. 13', 13" in FIG. 1) whose energy and pulse duration are tailored so that the returns from a selected part in the leading edge of the object (first reflecting area/surface of the object), at the optical module 33 are above a certain power threshold on the phase conjugator (PC 35) implementing e.g. SBS, SRS (Stimulated Brillouin or Raman Scattering), 4-way mixing processes, etc. Note, incidentally, that a general description of non-linear Phase Conjugation SBS and SRS based on the process of simulated scattering is provided in Wikipedia. Note that some PC methods inherently create undue frequency shift (i.e. shifting from a first beam wavelength to a second beam wavelength). This may adversely affect the subsequent amplification of the phase conjugated beam. In order to rectify the specified undesired frequency shift, known per se non-linear crystal may be used which will bring about a phase conjugated beam of substantially the specified first wavelength there, facilitating proper amplification.

b. The lifespan of the phase conjugator laser induced reflecting grating is selected in compliance with the pulse duration of the selected-part return from the illuminated object, e.g. ps(s) pulse durations (say of the order of less than 100 ps) for the short lived SRS PC and ns pulse durations for the SBS (say of the order of less than 100 ns), for normally longer lived, PC. Note that in order to implement the phase conjugation reflection process (and as is generally known per se) a grating has to be constructed. The time duration for constructing the grating depends on the PC type. For instance, for SRS a short duration is acceptable, whereas for SBS a substantially longer duration is acceptable. Hence, and by way of example, it readily arises that for a short pulse duration (say at a few ps range) a long lifespan phase conjugator (e.g. when utilizing SBS type) is not suitable, since, among others, by the time that the reflecting grating is constructed, the pulse that should be phase conjugated has already elapsed.

c. The dimension (depicted schematically as 11) of the PC crystal or liquid, substantially along the beam propagation path (e.g. beam 62) is selected in compliance with the a pulse duration, e.g. millimeter range for ps pulse durations, and ten(s) of centimeters for ns pulse duration. For instance said dimension being in one or few millimeter range for pico-seconds pulse durations that falls in the range of 1 to 100 pico-seconds. Note, incidentally, that the shape of the phase conjugator module is by no means binding and accordingly substantially every shape is applicable. More specifically, in accordance with certain embodiments, in the case of a pulse duration of say 1 ns representative of 30 cm, then the dimension of the phase conjugate module should exceed 15 cm. In the case of say 1 ps pulse duration, the specified dimension is in the order of 0.015 cm, however, typically, a phase conjugator of few millimeters may be utilized in order to provide mechanical integrity to withstand external loads. Note that in accordance with certain embodiments, the leading portion of the received pulsed beam produces phase conjugation and is amplified by its own replica. The trailing portion is substantially not amplified by the specified replica, thus causing a relatively low amplification of the trailing portion.

d. In order to obtain the specified amplified phased conjugated beam (which, as may be recalled, apply phase conjugation and amplification to mainly the leading portion of the received beam), the optical amplifier should have, in accordance with a certain embodiment, the following property: the leading portion of the received pulsed beam 61 having a pulse duration of e.g. a few ps, is amplified until saturation, and thus depleting most of the energy accumulated, due to the pumping of the amplifier, thereby reducing significantly the amplification of the trailing portion of the return pulse from the PC that is directed to the selected-part of the illuminated object.

e. Illuminating the selected area/surface of the object (from which the beam was reflected) with the amplified phase conjugated beam requires that the optical path from the object to the PC module will be an identical optical path, except, if required, of an angular shift introduced into the outgoing optical path from the PC to the object (as described for example with reference to FIG. 4 above).

f. If an optional known per se frequency convertor is also used in the laser assembly, the phase conjugator module provides the capability of distortion-free frequency conversion, such as frequency doubling, without affecting the designated selected area on the object.

g. It is optional to employ a known per se optical compressor in the laser assembly such that the pulse duration can be shortened by nonlinear pulse compression as discussed above, without affecting the designated selected area on the object, as disclosed above.

Turning now to FIG. 6, it illustrates is a graph representation of a reflected laser beam, in accordance with certain embodiments of the invention.

As specified above, due to selective phase conjugation and more specifically, among others, by virtue of the dimension of the PC module and the energy pumping/depletion paradigm of the optical amplifier, only the leading portion of the returning beam 61 reflected from a relatively small area within the part of the target (see for example also 22' 22" in FIG. 2) is subjected to phase conjugation and subsequent amplification, whereas the trailing portion 62 of the reflected beam is not duly amplified, and therefore does not generate significant illumination onto the object.

Figure 7:
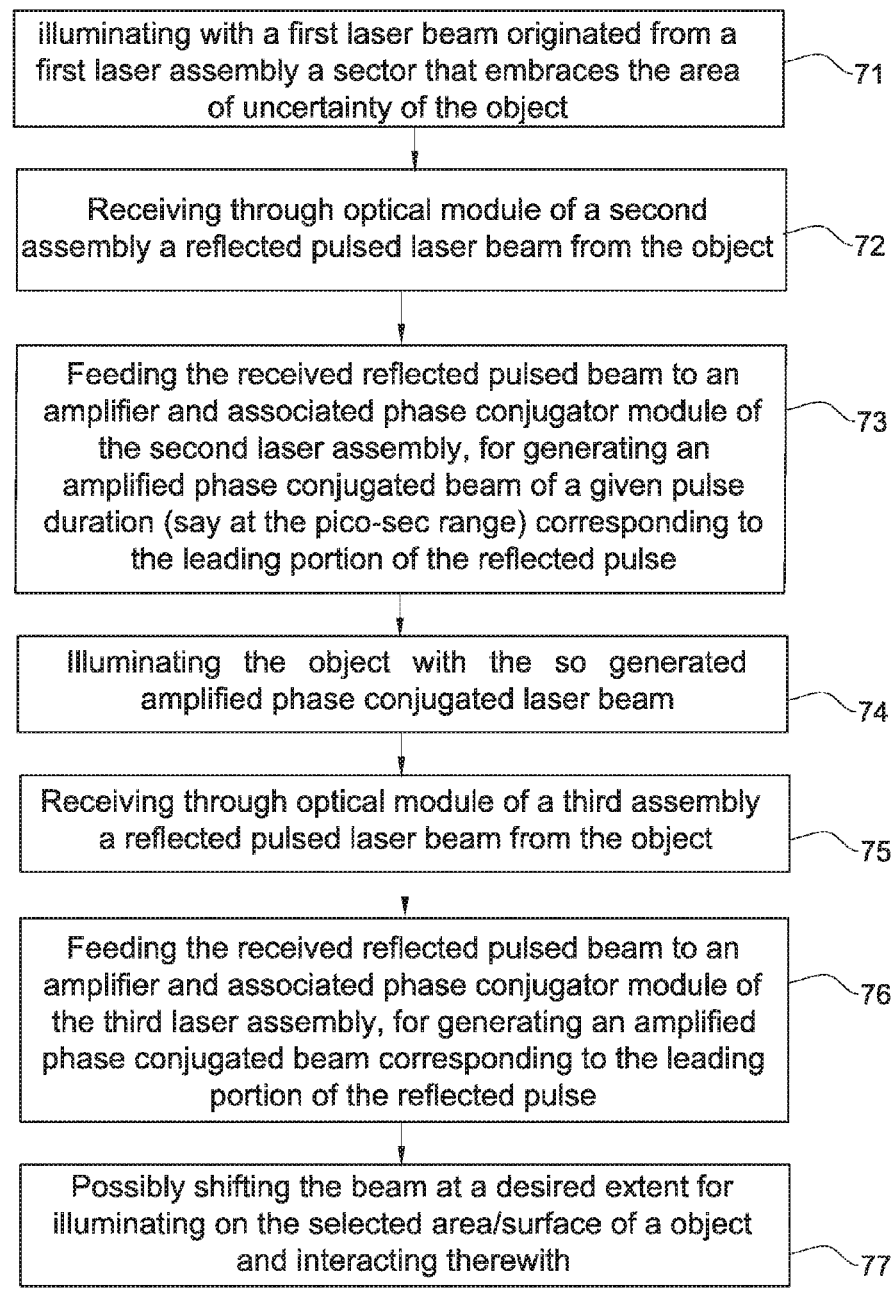
FIG. 7 is a flow diagram of a sequence of operations, in accordance with certain embodiments of the invention.

Bearing this in mind, attention is drawn to FIG. 7 (and occasionally also to FIG. 1) for describing the sequence of operations, in accordance with certain embodiments.

Thus, in step 71 a first laser beam which originated from a laser assembly (e.g. laser 1) illuminates a sector (e.g. 11, 11") that embraces the area of uncertainty of the object;

72 receiving through optical module of a second assembly a reflected pulsed laser beam (e.g. 12', 12") from the object;

73 feeding the received reflected pulsed beam to an amplifier and associated phase conjugator module of the second laser assembly, for generating an amplified phase conjugated beam of a given pulse duration (say at the ps range) corresponding to the leading portion of the received pulse which was reflected from a first reflecting area of the object which is the area of the object that defines the shortest optical path between the optical transmitter module, the object and the optical receiver module;

74 illuminating the object with the so generated amplified phase conjugated laser beam (e.g. 13', 13");

75 receiving through optical module of a third assembly a reflected pulsed laser beam from the object (e.g. 14);

76 feeding the received reflected pulsed beam to an amplifier and associated phase conjugator module of the third laser assembly, for generating an amplified phase conjugated beam corresponding to the leading portion of the received pulse which was reflected from an area of the object which is the area of the object that defines the shortest optical path between the optical transmitter module, the object and the optical receiver module;

77 possibly shifting the beam at a desired extent for illuminating on the selected area/surface of an object and interacting therewith (e.g. 16).

The procedure described with reference to FIG. 7 may be repeated as many times as required until a condition is met (for achieving the desired interaction).

It should be noted that the invention is not bound by the specified sequence of operations and accordingly at least one of the steps may be modified and/or others may be added, all depending upon the particular application.

Note that in the context of the description with reference to FIGS. 1 to 3 and 7, the utilization of the first laser assembly for illuminating a sector that embraces the area of uncertainty of the object (or portion thereof) and the first conjugated mirror module for receiving reflection from the object, is optional. Thus, in accordance with certain embodiments, steps 71 to 73 and, for example, laser 1 and phase conjugated module and optical amplifier fitted in laser assembly 15 are optional. The specified optional sub-system may serve, e.g. for tracking (e.g. a car moving on a conveyer belt) in the sense that it illuminates a sector that embraces the object (e.g. 32' and 32") or part thereof. Note that in accordance with certain embodiments, generating a wide illumination beam for illuminating a sector that embraces the object is achieved by utilization of appropriate optics fitted in laser assembly 1.

Bearing this in mind, in accordance with certain embodiments, a system that employs only the second and third laser assemblies (e.g. 13 and 15) as well as only the second phase conjugated module and amplifier (fitted in laser assembly 5) may be utilized for achieving interaction with the surface and/or area of the object in the manner specified. This may require to utilize other known per se tracking means, such as a camera.

In accordance with certain embodiments, one or more additional laser assemblies may be employed, e.g. for achieving a desired interaction with the object.

Note that in accordance with certain embodiments, the interaction with the surface/area may be altered for a different functionality. Thus, by way of example, after having drilled the surface to the desired extent, the laser's beam characteristics are modified by employing another laser assembly which illuminates a selected area. The invention is of course not bound by any of the specified interactions on a surface or area of the object and/or to the number of different interactions that are actually used.

The beam shifter will facilitate to change the position of a laser beam spot on an object during the illumination and to find the new selected area, and in accordance with certain embodiments it allows scanning the laser beam spot over the object's surface/area, thus achieving for example profiled drilling or cutting.

Note also that the optical modules of the various laser assemblies may be designed in known per se manners for achieving by way of example the following functionalities:

(i) collecting sufficient light energy from the received reflected beam for generating a signal which exceeds the internal noise of the laser assembly system, allowing the amplifier and phase conjugation modules to duly process the received beam; and (ii) reducing distortions of the beam that illuminated the object and which has an illumination direction that is substantially identical to that of the laser beam that was received by the specified optical module.

Note that the same optical module may serve more than one laser assembly, for instance the optical module which serves as transmitter optical module in one assembly may also serve as receiver optical module in the second laser assembly.

Note also that the description above referred to interaction and/or reflection from a surface/area (i.e. surface and/or area), because in certain embodiments the reflection/interaction is with the object's surface, whereas in other embodiments the reflection/interaction is from an area underneath the surface, and in certain other embodiments is a blending of both.

In accordance with certain embodiments, the illuminating with phase conjugated amplified pulsed laser beam will occur only if a given time duration has elapsed since the illumination of the area/surface of the object with said pulsed laser beam. This procedure may guarantee that the system is responsive to reflections from the object of interest and not from interfering objects that are encountered in the round trip of beam propagation from the laser assembly to the object and vice versa.

As used herein, the phrase "for example," "such as", "for instance" and variants thereof describe certain embodiments of the presently disclosed subject matter. Reference in the specification to "one case", "some cases" or variants thereof means that a particular feature, structure or characteristic described in connection with the embodiment(s) is included in at least one embodiment of the presently disclosed subject matter. Thus the appearance of the phrase "one case", "some cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG. 7, may be executed. In embodiments of the presently disclosed subject matter one or more stages illustrated in FIG. 7 may be executed in a different order and/or one or more groups of stages may be executed simultaneously. FIG. 1 illustrates a general schematic of the system architecture in accordance with an embodiment of the presently disclosed subject matter.

Those versed in the art will readily appreciate that the present disclosure is not bound by the specific architecture described with reference to any of FIGS. 1 to 5. By way of non-limiting example the optical amplifier may be composed of two or more cascaded optical amplifiers for achieving the desired amplification.

In other embodiments of the presently disclosed subject matter, the system may comprise more, and/or different modules than those shown in any of FIGS. 3 to 5.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A method for directing a laser pulsed beam towards a selected area/surface of an object, comprising:
   (a) transmitting from a laser assembly that includes an optical transmitter module a pulsed laser beam having a first pulse duration and illuminating therewith an area/surface of the object, thereby obtaining a reflected pulsed laser beam; said reflected pulsed laser beam including a leading portion reflected from a first reflecting area/surface of the object which is the area of the object that defines the shortest optical path between the optical transmitter module, the object and an optical receiver module;
   (b) receiving, in a second laser assembly that includes said optical receiver module, said reflected pulsed laser beam and converting it into an amplified phase conjugated pulsed beam of a second pulse duration;
   (c) transmitting from said second laser assembly said amplified phase conjugated pulsed beam and illuminating therewith on selected area/surface of the object.

2. The method according to claim 1, wherein said selected area being said first reflecting area/surface of the object.

3. The method according to claim 1, further comprising angularly shifting said amplified phase conjugated pulsed beam by a given shift extent, and wherein said selected area being said first reflecting area/surface of the object shifted dependent upon said shift extent.

4. The method according to claim 1, said first pulse duration falls in a nano-second range.

5. The method according to claim 1, wherein said second pulse duration falls in a pico-second range.

6. The method according to claim 1, further comprising:
   transmitting by a preliminary laser assembly a preliminary pulsed laser beam having a preliminary pulse duration and illuminating therewith a sector that embraces an area of uncertainty where the object is possibly located to thereby obtain a pulsed laser beam reflected from said area/surface of the object;
   receiving in said laser assembly said reflected pulsed laser beam and converting it into amplified phase conjugated pulsed beam to thereby generate said pulsed laser beam of said first pulse duration.

7. The method according to claim 6, wherein said laser assembly includes a laser transmitter for generating said pulsed laser beam.

8. The method according to claim 7, wherein said preliminary pulse duration falls in a nano-second range.

9. The method according to claim 1, further comprising, repeating said (a) to (c) to achieve interaction with the surface/area until a criterion is met.

10. The method according to claim 9, wherein said amplified phase conjugated pulsed beam having beam characteristics includes a beam intensity sufficient to give rise to said interaction.

11. The method according to claim 10, wherein said interaction includes cutting.

12. The method according to claim 10, wherein said interaction includes dimpling.

13. The method according to claim 10, wherein said interaction includes welding.

14. The method according to claim 10, wherein said interaction includes scribing.

15. The method according to claim 10, wherein said interaction includes photolithography.

16. The method according to claim 10, wherein said interaction includes drilling.

17. The method according to claim 1, wherein said optical amplifier is substantially depleted from preceding pumping after said amplified phase conjugated pulse beam that corresponds to said leading portion of the reflected pulse beam is generated.

18. The method according to claim 1, wherein said object is moving.

19. The method according to claim 18, wherein said object substantially maintains spatial orientation while possibly being translated.

20. The method according to claim 18, wherein said moving object is rotating at a known rotation rate.

21. The method according to claim 1, wherein said object is stationary.

22. The method according to claim 1, further comprising applying frequency conversion.

23. A method for directing a laser pulse beam towards a selected area/surface of a moving object, comprising:
   a) extracting a leading portion of a pulsed laser beam reflected from at least part of the object that is illuminated by a pulsed laser beam having a first pulse duration;
   b) said extracting including applying selective phase conjugation and amplifying the leading portion of the received pulse beam, which portion is reflected from a first surface/area of the object which is the area of the object that defines the shortest optical path between the optical transmitter module, the object and the optical receiver module, thereby generating an amplified phase conjugated pulsed beam at a second pulse duration and redirecting it to said selected area or to an area shifted by a aerial shift extent relative to said selected area.

24. A system for directing a laser pulsed beam towards a selected area/surface of an object, comprising:
   a laser assembly that includes an optical transmitter module configured to transmit a pulsed laser beam having a first pulse duration and illuminating therewith an area/surface of the object, thereby obtaining a reflected pulsed laser beam; said reflected pulsed laser beam including a leading portion reflected from a first reflecting area/surface of the object which is the area of the object that defines the shortest optical path between the optical transmitter module, the object and an optical receiver module;
a second laser assembly that includes a transmitter module, said optical receiver module, an optical amplifier associated with a phase conjugation mirror module configured to receive through said receiver module said reflected pulsed laser beam and converting it, utilizing at least said amplifier and phase conjugation modules, into an amplified phase conjugated pulsed beam of a second pulse duration;
said second laser assembly is configured to transmit through said transmitter module said amplified phase conjugated pulsed beam and illuminating therewith on selected area/surface of the object.

25. The system according to claim 24, wherein said selected area being said first reflecting area/surface of the object.

26. The system according to claim 24, further comprising a shifter configured to angularly shift said amplified phase conjugated pulsed beam by a given shift extent, and wherein said selected area being said first reflecting area/surface of the object shifted dependent upon said shift extent.

27. The system according to claim 24, wherein said first pulse duration falls in a nano-second range.

28. The system according to claim 24, wherein said second pulse duration falls in a pico-second range.

29. The system according to claim 24, wherein said optical amplifier is substantially depleted from preceding pumping after said amplified phase conjugated pulse beam that corresponds to said leading portion of the reflected pulse beam is generated.

30. The system according to claim 24, further comprising a frequency converter for applying frequency conversion.

31. The system according to claim 24, wherein said phase conjugation mirror module is selected from the group that includes Stimulated Brillouin Scattering (SBS) and Stimulated Raman Scattering (SRS).

32. The system according to claim 24, further comprising a non-linear optical compressor for generating pulsed beam with different pulse duration than the pulse duration of the received pulsed beam.

33. The system according to claim 32, wherein said non-linear optical compressor is incorporated in said phase conjugation module.

34. The system according to claim 24, wherein an optical module that functions as both said transmitter optical module and said receiver optical module is common to said laser assembly and second laser assembly.

35. The system according to claim 24, wherein the dimension of said phase conjugation module along the pulsed beam propagation path complies with said pulse duration.

36. The system according to claim 35, wherein said dimension being in one or few millimeter range for pico-seconds pulse durations that falls in the range of 1 to 100 pico-seconds.

37. The system according to claim 24, wherein the lifespan of the phase conjugation module is selected in compliance with the pulse duration of the received pulse laser beam.

38. The system according to claim 37, wherein a pulse duration that falls in the range of 1 to 100 ps complies with short lived phase conjugation module.

39. The system according to claim 37, wherein a pulse duration that falls in the range of 1 to 100 ns complies with a long lived phase conjugation module.

40. The system according to claim 24, further comprising:
a preliminary laser assembly that includes an optical transmitter module configured to transmit a preliminary pulsed laser beam having a preliminary pulse duration and illuminating therewith a sector that embraces an area of uncertainty where the object is possibly located to thereby obtain a pulsed laser beam reflected from said area/surface of the object;
said laser assembly includes an optical amplifier associated with phase conjugation mirror module and is configured to receive through said receiver module said reflected pulsed laser beam and converting it, utilizing at least said amplifier associated with phase conjugation mirror module, into amplified phase conjugated pulsed beam to thereby generate said pulsed laser beam of said first pulse duration.

41. The method according to claim 3, wherein the angular shifting of said amplified phase conjugated pulse beam is brought about by angularly shifting the reflected pulse beam.

* * * * *